Jan. 31, 1961  J. H. PENNEY  2,970,233
VENTILATING SYSTEM FOR A DYNAMOELECTRIC MACHINE
Filed Jan. 7, 1958

WITNESSES
John C. Hensley Jr.
Ernest P. Klipfel

INVENTOR
James H. Penney
BY  7. P. Lyle
ATTORNEY

United States Patent Office 2,970,233
Patented Jan. 31, 1961

2,970,233

VENTILATING SYSTEM FOR A DYNAMO-
ELECTRIC MACHINE

James H. Penney, East Amherst, N.Y., assignor to Westinghouse Electric Corporation, East Pittsburgh, Pa., a corporation of Pennsylvania Filed Jan. 7, 1958, Ser. No. 707,526

4 Claims. (Cl. 310—63)

My invention relates to ventilating systems for dynamoelectric machines and particularly to an improved cooling means for such a machine.

The output capacity of any given dynamoelectric machine is limited, among other things, by the maximum temperature rise that the internal parts of the machine can withstand without destruction, or permanent damage. To limit the temperature rise of internal parts of a dynamoelectric machine, it is customary to place a fan on the rotating member or armature capable of producing a forced circulation of ventilating air across the armature and stator frame.

In establishing a ventilating system for a given dynamoelectric machine, at least three things must be considered, namely, the total losses to be dissipated, the surface exposed for dissipating these losses, and the quantity of air required. If the quantity of ventilating air passing over an internal part is too small, the ventilating air will soon reach the same temperature as the surface to be cooled so that very little heat is carried away. If the ventilating air is increased in quantity beyond a certain value, the temperature of the ventilating air will rise only slightly and no appreciable increase in cooling ability will result. Such a system would result in no appreciable increase in output capacity and prove to be uneconomical.

The difficulty of getting the proper amount of ventilating air across the surfaces within the machine to be cooled is further complicated by the unequal resistance to air flow offered by the parallel paths through which the ventilating air must flow. In conventional systems no provisions are made for forcing the ventilating air to divide properly. Obviously, a proper volume of ventilating air is required across the rotating member as well as the stationary member since each have areas where maximum temperature or "hot spots" will occur.

The principal object of my invention is to provide a dynamoelectric machine with the proper proportioning of ventilating air passing through the machine.

Another object of my invention is the reduction of the volume of ventilating air required to effectively cool the internal parts of a dynamoelectric machine.

Other objects and advantages of my invention will be apparent from the following detailed description, taken in connection with the accompanying drawings, in which.

Figure 1:
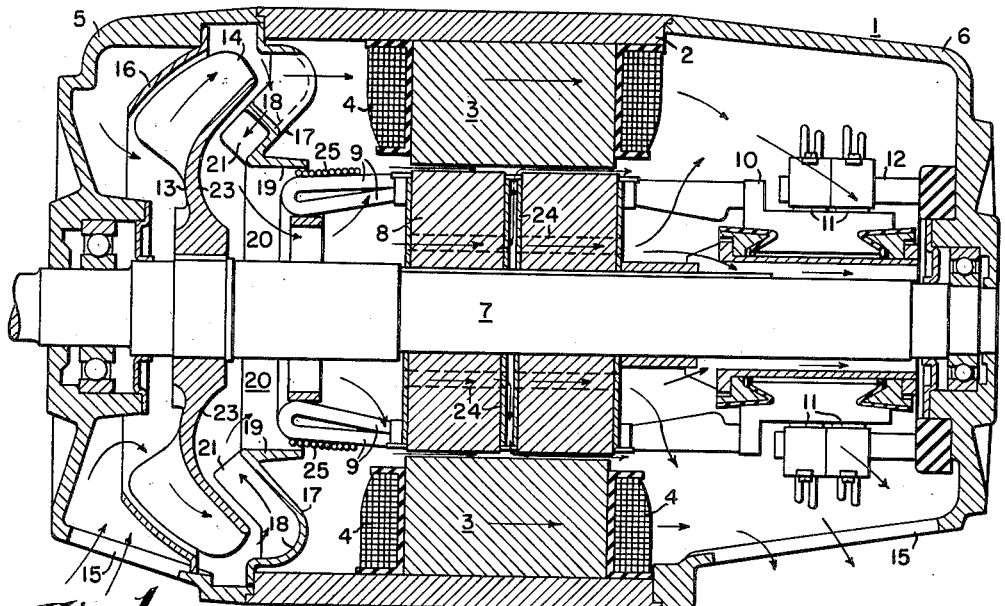
Figure 1 is a cross-sectional view of an illustrative embodiment of my invention in a dynamoelectric machine.
Figure 2:
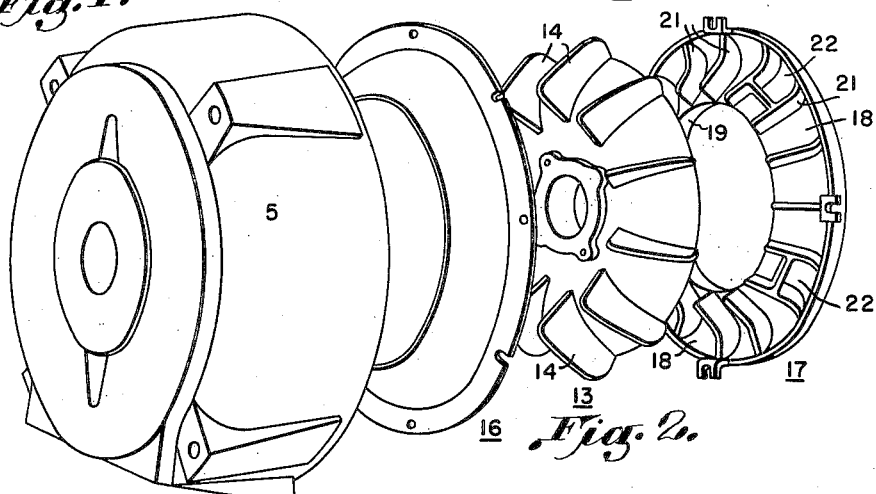
Fig. 2 is an exploded perspective view of the component parts making up my controlled ventilating system.
Figure 3:
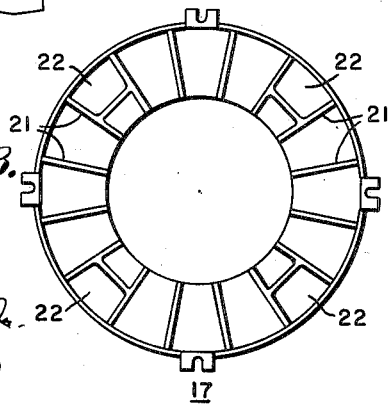
Fig. 3 is a vertical elevation view of a diffuser member.

My invention is applicable to any type of dynamoelectric machine but is shown in the drawings as embodied in a direct current motor having a ventilating system generally similar to that disclosed and claimed in a copending application of J. W. Erickson, Serial No. 710,893, filed January 24, 1958, and assigned to the assignee of the present invention.

The machine illustrated has a stator member 1 comprising a stator frame 2 supporting pole pieces 3 and field windings 4. The stator frame 2 is closed at one end by an air intake end bell 5 and at the opposite end by an air exhaust end bell 6. Means are provided in the end bells 5 and 6 for rotatably supporting a rotor member 7 comprising an armature 8 with an armature winding 9 and commutator 10. Brushes 11, riding on the commutator 10 and supported from the stator member 1 by brush rigging 12 of any suitable type, complete the general construction of a direct current motor.

As more fully set forth in the above-mentioned application, the basic ventilating system has a centrifugal fan 13 including generally radial blades 14 and an imperforate back plate 14a mounted on the end of the rotor member 7 opposite the commutator 10. The air intake end bell 5 has openings 15 for admitting the coolant air while the air exhaust end bell 6 has openings 15 for exhausting the ventilating air from the machine. An annular baffle 16 is concentrically disposed around the inner circumference of the air intake end bell 5 and is fastened thereto by any suitable means. The annular baffle 16 provides guiding means for directing the ventilating air entering through the air intake end bell 5 to the inlet of the centrifugal fan 13. A second annular baffle 17, which serves as a diffuser, is axially displaced inward from the first annular baffle 16 and is shown fastened to the stator member 1 by any suitable means. The second baffle 17 has a substantially concave side 18 which faces the first baffle 16. Radial vanes 21 are disposed on the concave side 18. The second baffle 17 also has a re-entrant cylindrical surface 19 which is concentric with the rotor member 7 forming a restricted passageway or channel 20 therewith. As can be seen in the drawing, the centrifugal fan 13 is coaxially mounted on the rotor member 7 and located between the first annular baffle 16 and the second annular baffle 17.

As stated previously, the parallel cooling paths within the motor through which the ventilating air must flow offer greatly different resistance to such air flow. The most desirable ventilating system should overcome this resistance and direct the cooling air in sufficient quantity along the surfaces where cooling is most needed. This is accomplished by the second annular baffle 17 which is provided with means for positively dividing the ventilating air to best advantage between the armature 8 and the stator 1. The baffle 17 has a plurality of openings 22 therethrough for the passage of air. In the preferred embodiment the openings 22 extend between the radial vanes 21. Four openings 90° apart are illustrated, but it will be understood any arrangement of openings can be used to divide the air to best advantage. The ventilating air directed to the second annular baffle 17 by the fan 13 is divided by the baffle 17, a predetermined part of the air passing through the openings 22 towards the stator frame 2 and field winding 4 while the remainder of the ventilating air is directed to the discharge side of the centrifugal fan 13. The entire ventilating air distribution through the machine is indicated by the arrows on the figure.

In operation, the ventilating air enters the machine through openings 15 in the air intake bell 5. The first annular baffle 16 directs this air to the centrifugal fan 13 from which it is discharged by the radial blades 14 towards the second annular baffle 17. It is here that the ventilating air is positively divided into two critical paths each of which requires a selected volume of air to most efficiently conduct heat from the internal parts of the machine.

Following the first or stator frame path, a predetermined part of the ventilating air passes through the openings 22 in the second annular baffle 17 thereby discharging between the field winding 4 and stator frame 2.

This path is of low resistance to air flow because of the natural configuration of the usual salient pole machine. As a result, the ventilating air discharging into the location of the stator member has a low pressure and high volume which is selectively determined by the size and number of the openings 22 in the second annular baffle 17. The ventilating air following the stator frame path eventually joins the remainder of the ventilating air as it leaves the machine through openings 15 in the air exhaust end bell 6.

The remainder of the ventilating air flows in a second path through the machine. This air is slightly compressed by the movement of the centrifugal fan 13 relative to the second annular baffle 17 and radial vanes 21. The radial vanes 21 and the substantially concave side 18 equally divide and channel the remainder of the ventilating air towards a substantially concave solid surface 23 on back plate 14a on the discharge side of the centrifugal fan 13; that is, a surface 23 with no openings through it and capable of functioning as a baffle. The substantially concave surface 23 is disposed radially inward from the substantially concave side 18 so that the ventilating air is directed to a path closer to the armature 8. It is in this area where the path for ventilating air is relatively restricted by the size of the passages and offers the most resistance to flow. To overcome the greater resistance to flow, the slightly pressurized ventilating air is directed by the substantially concave surface 23 through the restricted passageway 20. The restricted passageway 20 keeps the pressurized ventilating air close to the rotor member 7 so that most of the ventilating air is forced through the usual passageways 24 in the rotor member 7 while some air flows through the end turns of the windings 9 in the spaces between the banding 25 and the armature core 8. In such a way, the remainder of the ventilating air is forced along the path of greater resistance and, as a result, flows under relatively high pressure. The ventilating air following the second path joins the ventilating air from the first path as it leaves the machine through the openings 15 in the air exhaust end bell 6.

It is now readily apparent that my controlled directional ventilating system for a dynamoelectric machine provides a most efficient ventilating system for keeping a dynamoelectric machine within its safe operating temperature limits. The direction of ventilating air is not left to chance but the air is positively divided to best advantage between the rotor member 7 and stator member 1. The result is an increased level of effective cooling with a minimum volume of ventilating air. Uniform cooling can be obtained on the surfaces of all internal parts of the machine by the proper selection of the number and location of the openings 22 in the second annular baffle 17. By properly proportioning the ventilating air to each path, considerable latitude is gained for any desired alteration of the internal field configuration or armature structure.

The direction of flow, from the air intake end bell towards the commutator, is such that carbon dust from commutation of the machine is directly expelled out of the machine rather than drawn through the machine where it could interfere with proper heat conduction and be detrimental to insulation life. Any foreign material drawn into the machine does not strike the commutator directly.

Although this invention has been described with a certain degree of particularity, it is to be understood that this present disclosure has been made only by way of example and numerous changes in the details, combination and arrangement of parts may be accomplished without departing from the spirit and scope of the invention.

I claim as my invention:

1. In a dynamoelectric machine having a rotor member and a stator member, a fan having a single set of blades coaxially mounted on said rotor member, and baffle means adjacent the discharge side of said fan for dividing and positively directing ventilating air through the machine so that a predetermined volume of the air passes at relatively low pressure over and through the stator member, and means for directing the remainder of the air at relatively higher pressure over and through said rotor member.

2. In a dynamoelectric machine having a rotor member and a stator member, a fan coaxially mounted on said rotor member, baffle means for directing ventilating air towards said fan, means adjacent the discharge side of said fan for dividing and positively directing the ventilating air through the machine so that a predetermined volume of the air passes over and through the stator member at a predetermined pressure and the remainder of the air is directed to the discharge side of the fan, at a predetermined pressure said fan having a concave imperforate surface on said side adapted to direct the remainder of air over and through said rotor member.

3. In a ventilating system for a dynamoelectric machine having a rotor member and a stator member, said rotor member having a fan mounted coaxially thereon, said fan having an imperforate back plate on the discharge side thereof, an annular baffle disposed closely adjacent the discharge side of said fan, said baffle and said backplate having complementary surfaces closely spaced axially to form a restricted air passage directed toward the central portion of said backplate, said baffle having a plurality of openings therethrough for the passage of air, a predetermined part of the ventilating air passing through the openings in said baffle toward said stator member while the remainder of the air is slightly compressed by the movement of the air through said restricted air passage and directed toward said rotor member by said backplate.

4. In a ventilating system for a dynamoelectric machine having a rotor member and a stator member, said rotor member having a centrifugal fan mounted coaxially thereon, said fan having an imperforate backplate on the discharge side thereof, an annular baffle disposed adjacent the discharge side of said fan, a plurality of radially disposed vanes on the side of said baffle adjacent said fan, said baffle having a plurality of openings therethrough for the passage of air, said baffle having a reentrant cylindrical surface cooperating with said rotor member to form a restricted channel therewith, a predetermined part of the ventilating air passing through the openings in said baffle toward said stator member while the remainder of the ventilating air is slightly compressed by the movement of the air through said restricted air passage and directed toward said rotor member through said restricted channel.

References Cited in the file of this patent

UNITED STATES PATENTS

| 1,835,248 | Suter | Dec. 8, 1931 |
| 2,604,501 | Wightman | July 22, 1952 |

FOREIGN PATENTS

| 183,037 | Switzerland | Aug. 1, 1936 |
| 288,853 | Switzerland | June 1, 1953 |
| 616,902 | Germany | Aug. 8, 1935 |